United States Patent
Suzuki (10) Patent No.: US 6,761,131 B2
(45) Date of Patent: Jul. 13, 2004

(54) APPARATUS FOR DETERMINING DOG'S EMOTIONS BY VOCAL ANALYSIS OF BARKING SOUNDS AND METHOD FOR THE SAME

(75) Inventor: Matsumi Suzuki, Shibuya-Ku (JP)

(73) Assignees: Index Corporation, Tokyo (JP); Takara Co. Ltd., Tokyo (JP)

( * ) Notice: Subject to any disclaimer, the term of this patent is extended or adjusted under 35 U.S.C. 154(b) by 0 days.

(21) Appl. No.: 10/465,575

(22) Filed: Jun. 20, 2003

(65) Prior Publication Data

US 2003/0221630 A1 Dec. 4, 2003

Related U.S. Application Data

(63) Continuation of application No. PCT/JP02/00956, filed on Feb. 6, 2002.

(30) Foreign Application Priority Data

Aug. 6, 2001 (JP) .......................................... 2001-238389

(51) Int. Cl.[7] .............................................. A01K 29/00

(52) U.S. Cl. ....................................................... 119/174

(58) Field of Search ......................... 119/174; 340/573.1

(56) References Cited

U.S. PATENT DOCUMENTS

| | | |
|---|---|---|
| 4,245,587 A | 1/1981 | Cooper et al. |
| 4,542,525 A | 9/1985 | Hopf |
| 4,707,685 A | 11/1987 | Carrier et al. |
| 4,763,278 A | 8/1988 | Rajasekaran et al. |
| 4,769,846 A | 9/1988 | Simmons |
| 4,780,906 A | 10/1988 | Rajasekaran et al. |
| 4,854,328 A | 8/1989 | Pollack |
| 4,876,674 A | 10/1989 | Parmely et al. |
| 5,003,603 A | 3/1991 | Searcy et al. |
| 5,025,471 A | 6/1991 | Scott et al. |
| 5,315,704 A | 5/1994 | Shinta et al. |
| 5,651,070 A | 7/1997 | Blunt |
| 5,668,780 A | 9/1997 | Hsieh |
| 5,677,675 A | 10/1997 | Taylor et al. |
| 5,749,324 A | 5/1998 | Moore |
| 5,790,033 A | 8/1998 | Yamamoto |
| 5,842,162 A | 11/1998 | Fineberg |
| 5,901,660 A | 5/1999 | Stein |
| 5,927,233 A | 7/1999 | Mainini et al. |
| 6,058,889 A | 5/2000 | Curen et al. |
| 6,151,571 A * | 11/2000 | Pertrushin .................... 704/209 |

(List continued on next page.)

FOREIGN PATENT DOCUMENTS

| | | |
|---|---|---|
| EP | 1 214 907 | 6/2002 |
| JP | 2-93861 | 4/1990 |
| JP | 5-12023 | 1/1993 |
| JP | 5-282273 | 10/1993 |
| JP | 9-206291 | 8/1997 |

*Primary Examiner*—Peter M. Poon
*Assistant Examiner*—Bethany L. Griles
(74) *Attorney, Agent, or Firm*—Sughrue Mion, PLLC (57) ABSTRACT

A method of determining a dog's emotions from its voice with objective supports. The invention follows the procedures of converting dog's voices into electrical audio signals, extracting characteristics in a time to frequency component relation map of the audio signals as a input voice pattern, storing in advance in memory reference voice patterns for various emotions that respectively represent characteristics of time to frequency component relation maps, comparing the input voice pattern with the reference voice patterns, and determining what a dog feels by declaring emotion of the particular reference voice pattern showing the highest correlation with the input voice pattern as a result of the comparison, and emotions represented by the reference voice patterns include "loneliness", "frustration", "aggressiveness", "assertiveness", "happiness", and "wistfulness", and hence, the present invention attains an effective way of determining dog's emotions with objective supports.

2 Claims, 8 Drawing Sheets

U.S. PATENT DOCUMENTS

| | | |
|---|---|---|
| 6,178,923 B1 | 1/2001 | Plotkin |
| 6,243,671 B1 | 6/2001 | Lago et al. |
| 6,275,806 B1 | 8/2001 | Pertrushin |
| 6,353,810 B1 * | 3/2002 | Petrushin .................... 704/236 |
| 6,431,121 B1 | 8/2002 | Mainini et al. |
| 6,496,115 B2 | 12/2002 | Arakawa |
| 6,535,131 B1 | 3/2003 | Bar-Shalom et al. |
| 6,607,484 B2 * | 8/2003 | Suzuki et al. ............... 600/300 |
| 2002/0002460 A1 | 1/2002 | Pertrushin |
| 2002/0010587 A1 | 1/2002 | Pertrushin |
| 2002/0194002 A1 | 12/2002 | Pertrushin |
| 2003/0033145 A1 | 2/2003 | Pertrushin |

* cited by examiner

Emotions Based Reference Voice Patterns (for Individual Dog Group)

| Band | Dog Group A | | | | | Dog Group B | | |
|---|---|---|---|---|---|---|---|---|
| | Emotion Category a | | Emotion Category b | ... | Emotion Category f | Emotion Category a | ... | Emotion Category f |
| | a1 | a2 | b1 | ... | f5 | a1 | ... | f5 |
| 1 | α1 | α2 | ... | ... | ... | αm0 | ... | ... |
| 2 | β1 | β2 | ... | ... | ... | βm0 | ... | ... |
| 3 | γ1 | γ2 | ... | ... | ... | γm0 | ... | ... |
| 4 | δ1 | δ2 | ... | ... | ... | δm0 | ... | ... |
| 5 | ε1 | ε2 | ... | ... | ... | εm0 | ... | ... |
| ... | ... | ... | ... | ... | ... | ... | ... | ... |

APPARATUS FOR DETERMINING DOG'S EMOTIONS BY VOCAL ANALYSIS OF BARKING SOUNDS AND METHOD FOR THE SAME

This application is a continuation of PCT/JP02/00956 filed Feb. 6, 2002.

TECHNICAL FIELD

The present invention relates to an apparatus of determining animal's emotions from vocal analysis of barking sounds, and more particularly, it relates to an apparatus of determining dog's emotions by vocally analyzing barking sounds.

BACKGROUND ART

Above all animals, especially dogs have had very close relations to human beings for a long time, and they have played important roles in human societies, not only serving as work dogs like watchdogs and lifeguards but also as pets which live together with family members of human beings. Thus, it is not an exaggeration to say that human beings have had a dream for a long time to communicate with dogs, and actually various attempts have been done to realize the dream. Japanese Unexamined Patent Publication No. H10-3479 titled "Interpretation Method for Reading Animal's Mind and Interpretation Device for the Same" discloses a method of interpreting animal's mind and a device for the same where voice made by animals such as pets and livestock is received and converted into audio signals while actions of the animals are shot into moving pictures and converted into video signals, and then, the audio and video signals are compared with reference data on voices and motions that have been ethologically analyzed. Relying on this technology, voices and actions of a dog can be interpreted to read its mind, but this prior art fails to provide any practical data of dog's voices and actions that seem to be a kind of expression of its emotions.

There has not been any means to reason objectively how a dog feels on the basis of vocal analysis in which, upon the definite understanding of the relation between dog's emotions and its barking sounds, reference voice patterns are set corresponding to such emotions, and actual voice of any specific dog is compared to the reference voice patterns. More accurately speaking, there have been no objective supports in effect to identify a specific dog's emotion from its voice. The present invention is made to overcome the above-mentioned disadvantages of the prior art, and it is an object of the present invention to provide a device of receiving actual voice of a dog to determine dog's emotions with objective supports by first creating reference voice patterns corresponding to various emotions of a dog and then matching the reference patterns with actual voice patterns of a dog.

DISCLOSURE OF THE INVENTION

The Invention as defined in Claim 1 comprises means for converting a dog's voice into electrical audio signals, means for extracting characteristics in a time to frequency component relation map of the audio signals as an input voice pattern, means for storing reference voice patterns that represent various dog's emotions expressed by its voice in a form of the time to frequency component relation map, means for comparing the input voice pattern with the reference voice patterns, and means for determining dog's feeling by choosing the pattern most closely matched to the input voice pattern; characterized in that the reference voice patterns include a reference voice pattern expressing loneliness that is made up of significant frequency components around 5000 Hz without frequency components of 3000 Hz or below but lacks harmonics and lasts for 0.2 to 0.3 second, a reference voice pattern expressing frustration that is made up of a sub-pattern for 0.3 to 1 second of fundamental tones ranging from 160 to 240 Hz with harmonics up to 1500 Hz and a subsequent sub-pattern of 250 to 8000 Hz without definite fundamental tones and harmonics but conspicuous for frequency components around 1000 Hz, a reference voice pattern expressing aggressiveness that is made up of a sub-pattern ranging from 250 to 8000 Hz without definite fundamental tones and harmonics and conspicuous for frequency components around 1000 Hz and a subsequent sub-pattern for 0.8 to 1.5 second of fundamental tones ranging from 240 to 360 Hz with harmonics definite up to 1500 Hz and reaching 8000 Hz, a reference voice pattern expressing assertiveness that is made up of frequency components ranging from 250 to 8000 Hz without definite fundamental tones and harmonics and conspicuous for frequency components around 1000 Hz, 2000 Hz and 5000 Hz, respectively, a reference voice pattern expressing happiness including a sub-pattern of frequency components ranging from 250 to 8000 Hz without definite fundamental tones and harmonics and with conspicuous frequency components around 1000 Hz and a subsequent sub-pattern of fundamental tones ranging from 200 to 300 Hz with harmonics up to 1500 Hz, and a reference voice pattern expressing wistfulness that is made up of fundamental tones ranging from 250 to 500 Hz with harmonics up to 8000 Hz and with frequency of the fundamental tones being varied.

The invention as defined in Claim 2 comprises steps of converting a dog's voice into electrical audio signals, extracting characteristics in a time to frequency component relation map of the audio signals as an input voice pattern, storing reference voice patterns that represent various dog's emotions expressed by its voice in a form of the time to frequency component relation map, comparing the input voice pattern with the reference voice patterns, and determining how the dog feels from the most closely matched pattern to the input voice pattern; characterized in that the reference voice patterns include a reference voice pattern expressing loneliness that is made up of significant frequency components around 5000 Hz without frequency components of 3000 Hz or below but lacks harmonics and lasts for 0.2 to 0.3 second, a reference voice pattern expressing frustration that is made up of a sub-pattern for 0.3 to 1 second of fundamental tones ranging from 160 to 240 Hz with harmonics up to 1500 Hz and a subsequent sub-pattern of 250 to 8000 Hz without definite fundamental tones and harmonics but conspicuous for frequency components around 1000 Hz, a reference voice pattern expressing aggressiveness that is made up of a sub-pattern ranging from 250 to 8000 Hz without definite fundamental tones and harmonics and conspicuous for frequency components around 1000 Hz and a subsequent sub-pattern for 0.8 to 1.5 second of fundamental tones ranging from 240 to 360 Hz with harmonics definite up to 1500 Hz and reaching 8000 Hz, a reference voice pattern expressing assertiveness that is made up of frequency components ranging from 250 to 8000 Hz without definite fundamental tones and harmonics and conspicuous for frequency components around 1000 Hz, 2000 Hz and 5000 Hz, respectively, a reference voice pattern expressing happiness including a sub-pattern of frequency components ranging from 250 to 8000 Hz without definite fundamental tones and harmonics and with conspicuous frequency components around 1000 Hz and a subsequent sub-pattern of fundamental tones ranging from 200 to 300 Hz with harmonics up to 1500 Hz, and a reference voice pattern expressing wistfulness that is made up of fundamental tones ranging 250 to 500 Hz with harmonics up to 8000 Hz and with frequency of the fundamental tones being varied.

BEST MODE OF THE INVENTION

Figure 1:
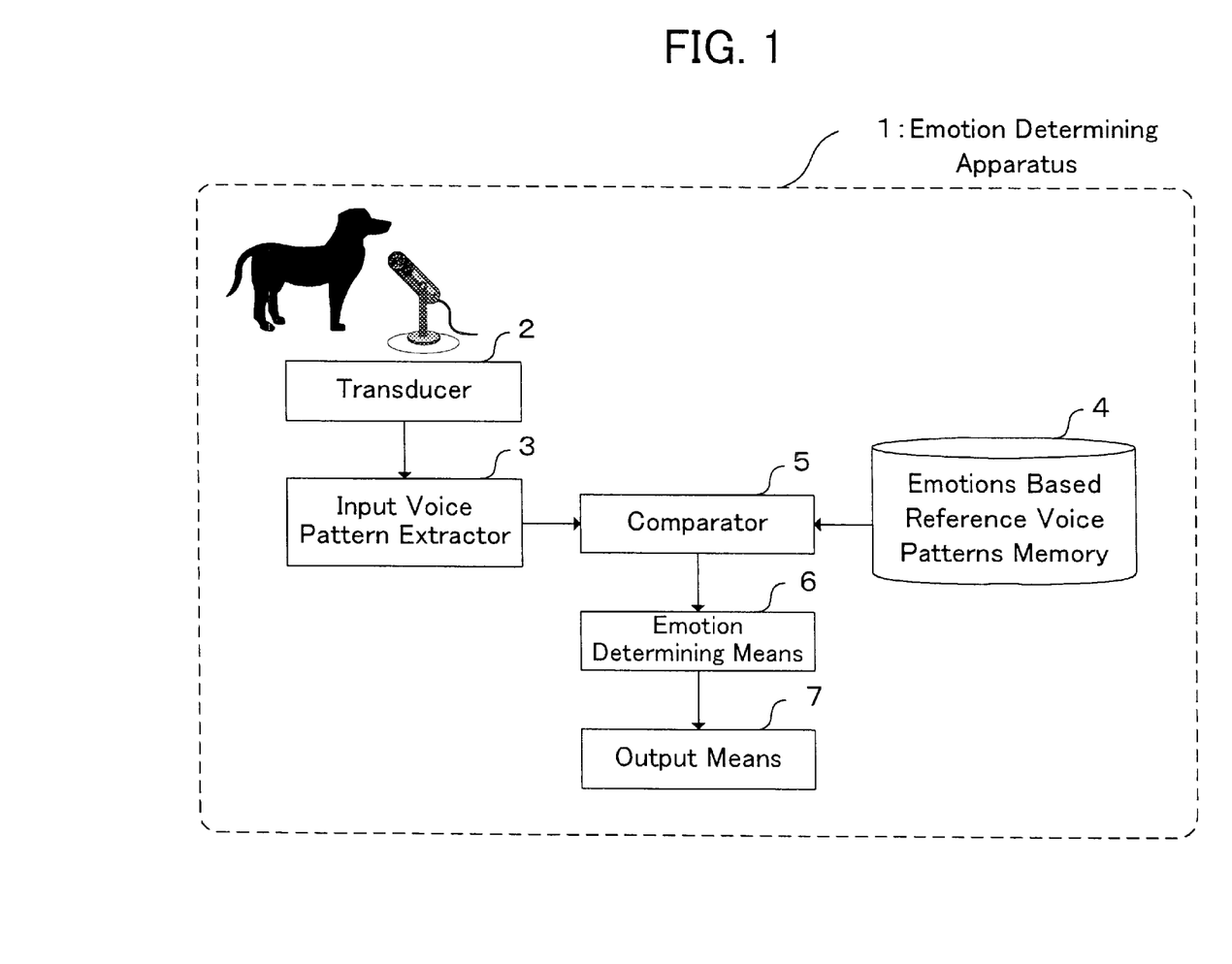
FIG. 1 is a diagram of system structure of a preferred embodiment according to the present invention.

A preferred embodiment of the present invention will now be described in conjunction with the accompanying drawings. FIG. 1 is a block diagram illustrating a structure of a device for determining dog's emotions from vocal analysis of its barking sounds (referred to as "emotion determining apparatus" hereinafter) denoted by reference numeral 1 in accordance with the present invention. The emotion determining apparatus 1 is comprised of a transducer 2, an input voice pattern extractor 3, an emotions based reference voice patterns memory 4, a comparator 5, an emotion determining means 6, and an output means 7.

The transducer 2 converts a voice made by a dog into digitized audio signals. The transducer 2 consists of a microphone, an A/D converter, and the like which are not individually shown. The voice of a dog is received by the microphone and converted into electrical signals. The electrical signals are digitized by the A/D converter to produce audio signals. The microphone may be downsized and separated as an independent wireless microphone so as to enable attachment to a dog of which utterance is to be analyzed.

The input voice pattern extractor 3 functions to extract characteristic voice patterns from the audio signals. The input voice pattern extractor 3 consists of a CPU (or otherwise a DSP), ROM that stores a program which makes the CPU serve as the input voice pattern extractor 3, RAM for work areas, and the like that are not individually shown. A voice pattern is, in general, represented in a form of a time to frequency component relation map of the audio signals. The relation map is a representation of time-varying frequency distribution in a graph where the horizontal axis shows time while the vertical axis indicates frequency, and it is preferable that the time-varying frequency distribution is divided by a certain time interval and a certain frequency difference into grids to give another representation of voice energy distribution within each of the grids. The representation of the relation map allows for comprehensive and quantitative handling of the audio signals. More specifically, the relation map may be provided in a manner where a frequency band is segmented in sub-bands in each of which voice energy distribution is numerically expressed. A bandwidth and the number of the sub-bands can be determined appropriately. Advantageously, the voice energy is mathematically processed in some appropriate way so as to make resultant time related characteristics more definite. Such a mathematical processing includes various mathematical operations. For instance, appropriate selection of window function, appropriate setting of a dead band, appropriate setting of FFT transformation units, appropriate setting of release conditions, appropriate setting of reference method, appropriate setting of attack conditions, appropriate setting of reference point requirements, and the like should be carried out to refine the relation map so as to be suitable for the objective. The similar mathematical processing is employed to create reference voice patterns for various emotions as mentioned later. In this way, processing the input voice pattern and the reference voice patterns in the same mathematical operations facilitates simplification of a subsequent procedure of using the comparator 5 to compare the input voice pattern with the reference voice patterns, as described later.

Figure 8:
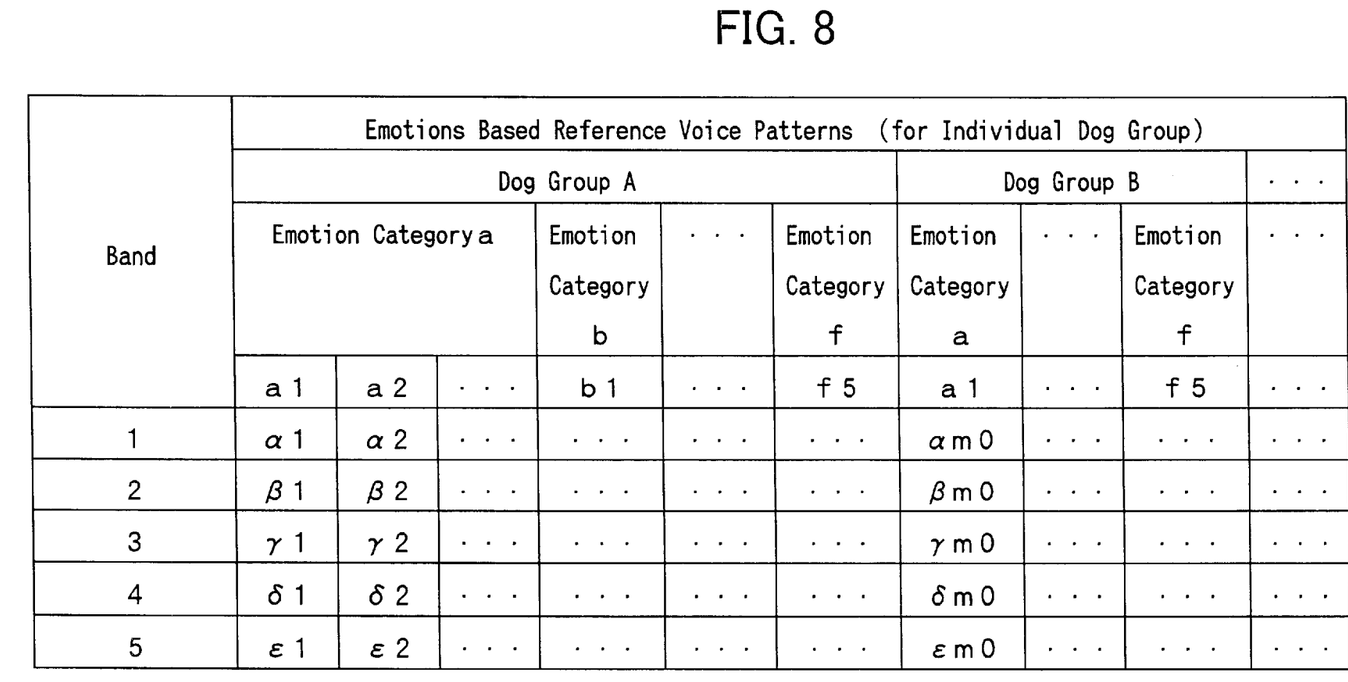
FIG. 8 is a table providing sample data of reference voice patterns practically observed.

The emotions based reference voice patterns memory 4 is a component that stores the reference voice patterns for various emotions. The emotions based reference voice patterns memory 4 is typically ROM that stores the reference voice patterns. The ROM can be a rewritable flash ROM which enables rewriting data to provide for needs to update the reference voice patterns as desired in future and add other categories of emotions. The reference voice patterns are generally provided, respectively, in a form of the time to frequency component relation map of the audio signals. The relation map is a representation of time-varying frequency distribution of voice where the horizontal axis shows time while the vertical axis indicates frequency, and preferably, the time-varying frequency distribution is divided by a certain time interval and a certain frequency difference into grids to give another representation of voice energy distribution within each of the grids. The reference voice patterns may be represented in a pattern where common but conspicuous part of the relation map is particularly emphasized. This is useful in comparing the input voice pattern with the reference voice patterns in that even for a variety of input voice patterns, each of them can match with one of the reference voice patterns which corresponds to either one of the emotions so long as it assumes a common but conspicuous part corresponding to the emotion, and this enhances reliability of emotion analysis. More specifically, it is preferable that the mathematical processing, which is carried out to create the relation map of the input voice pattern in the input voice pattern extractor 3 as mentioned above, is similarly performed in advance in creating the reference voice patterns. FIG. 8 depicts samples of the reference voice patterns that are stored in the emotions based reference voice patterns memory 4. Frequency band is divided into five sub-bands, and for each band, the memory stores numerical data resulted from appropriate mathematical processing of the voice energy correlated with time factors. The numerical data can be expressed in a set of values, as in ($\alpha x$, $\beta x$, $\gamma x$, $\delta x$, $\epsilon x$) for the x-th numerical data, for example. Expressions of these values are not limited to those in a scalar quantity but may be those in a vector quantity. Since tones of a voice vary depending upon breeds and sizes of dogs, the reference voice patterns in this embodiment are created for individual dog group such as Group A, Group B, and so forth to enhance accuracy of the emotion analysis. The reference voice patterns contain data for each of the dog groups and for each of the categories of emotions (Categories a to f). As for a single emotion category unique to some dog group, the reference voice patterns also includes a plurality of typical data like a data a1, a2, . . . for Emotion Category a unique Dog Group A. In this way, if a dog belonging to some dog group makes voices in a phonetically wide range of utterance, it is similarly possible to accurately analyze its emotions.

In creating the reference voice patterns for dog's various emotions, voice data were collected from a wide range of dogs that were giving utterance to their various emotions. The dog's emotions during collecting the voice data were ethologically analyzed by observing their actions and behaviors at that time. The collected voice data were classified into one of emotion categories, and a voice pattern commonly existing in the data of the same category was defined as a reference voice pattern for that kind of emotion. Only common but conspicuous part of the reference pattern may be emphasized. Six basic categories of emotions were selected, including "loneliness", "frustration", "aggressiveness", "assertiveness", "happiness", and "wistfulness". The actions, behaviors, and emotions of dogs are ethologically reasoned in a manner of a single emotion category corresponding to some behavior pattern as follows: When the emotion of a dog is "loneliness", the dog stays still with their muzzles pointing upward and whine, seemingly gazing at a point. When the emotion of a dog is "frustration", the dog growls heavily in disgust but seems not to know how they should do. When the emotion of a dog is "aggressiveness", the dog barks in some exaggerated tone without coming so close to nor staying so apart from a man or an object. When the emotion of a dog is "assertiveness", the dog continually yips in a high tone while apparently wanting to attract attention. When the emotion of a dog is "Happiness", the dog is playfully jumping onto their masters and romping about the masters as well as barking. When the emotion of a dog is "wistfulness", the dog gives an appealing bark to show it can't wait any longer and hastens their masters during its meal or walk. The voice patterns respectively associated with these emotions will be detailed below.

Figure 2:
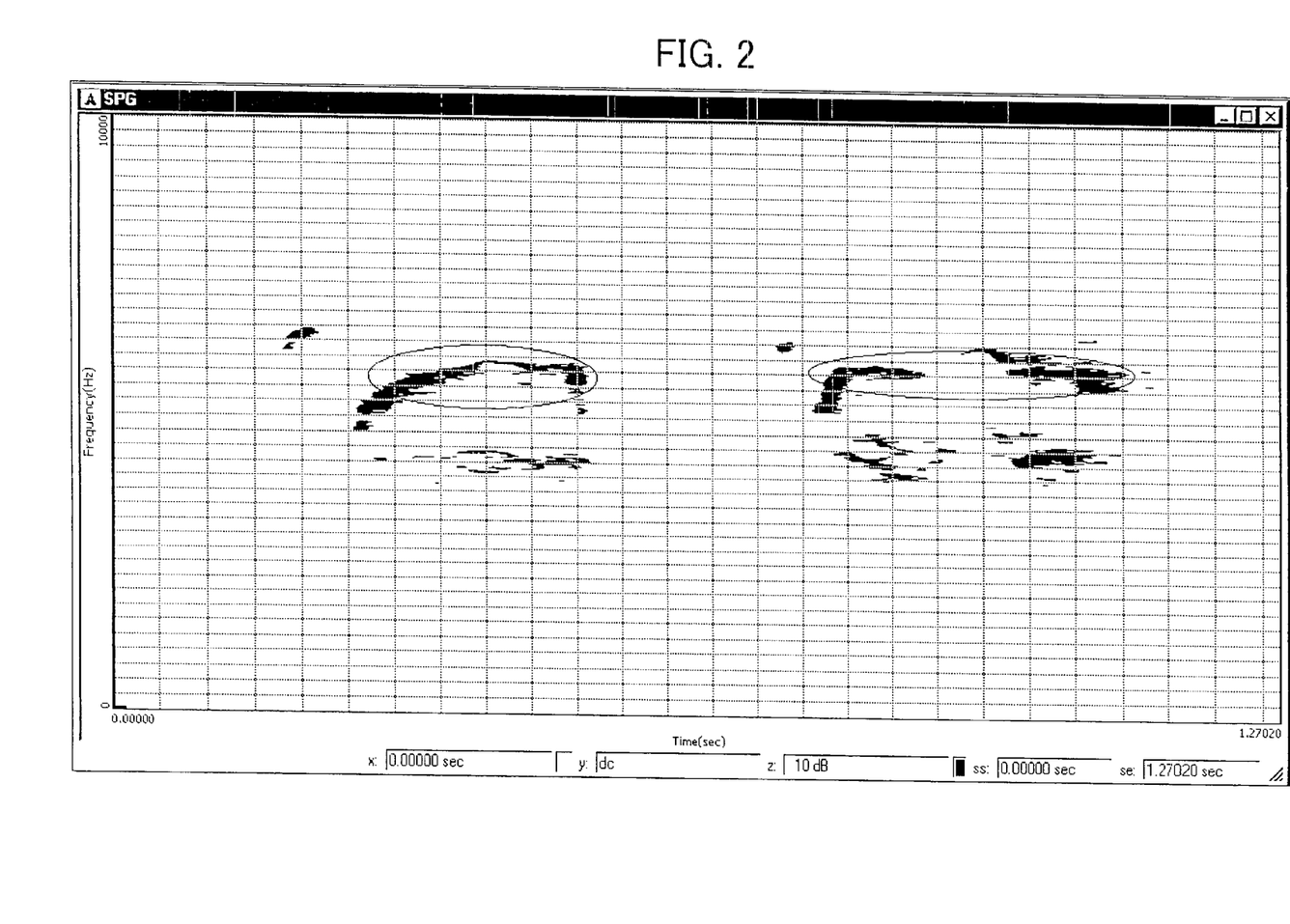
FIG. 2 is a diagram illustrating a "time to frequency component relation map" that represents a typical voice pattern to "loneliness" (the horizontal axis is divided every 0.05 second while the vertical axis is divided every 250 Hz; and significant characteristics are encircled)

A voice pattern for "loneliness" is made up of significant frequency components around 5000 Hz without frequency components of 3000 Hz or below and harmonics, and it lasts for 0.2 to 0.3 second. This voice pattern is audible to men as a "whining" sound. FIG. 2 is a graph of the "time to frequency relation map" that represents the typical voice pattern expressing "loneliness".

Figure 3:
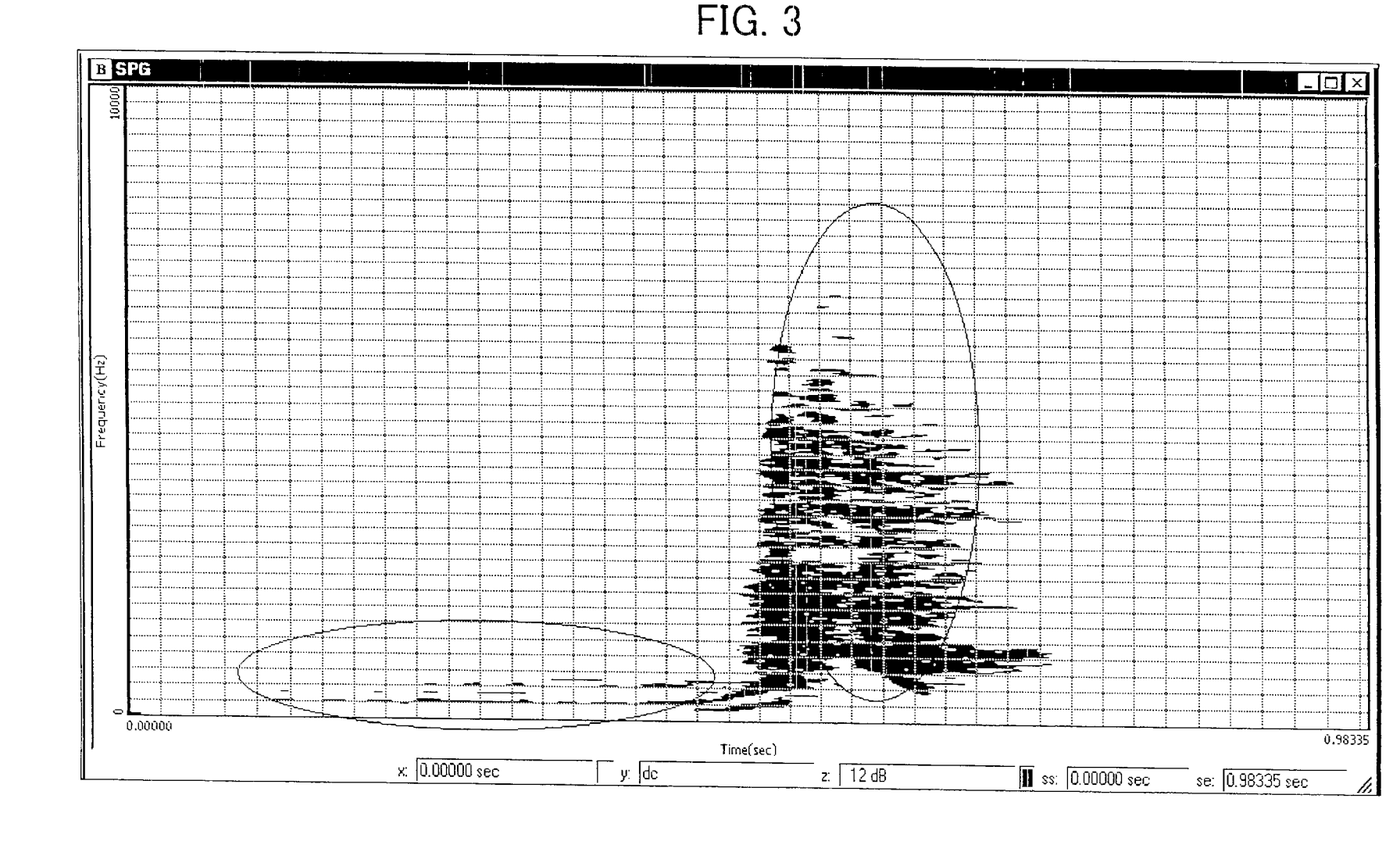
FIG. 3 is a diagram illustrating "time to frequency component relation map" that represents a typical voice pattern to "frustration" (the horizontal axis is divided every 0.025 second while the vertical axis is divided every 250 Hz; and significant characteristics are encircled)

A voice pattern for "frustration" is made up of a sub-pattern for 0.3 to 1 second of fundamental tones ranging from 160 to 240 Hz with harmonics up to 1500 Hz, and a subsequent sub-pattern of 250 to 8000 Hz without definite fundamental tones and harmonics, but conspicuous for frequency components around 1000 Hz. This voice pattern often sounds like "Woooof, Wow". FIG. 3 is graph of the "time to frequency component relation map" that represents the typical voice pattern for "frustration".

Figure 4:
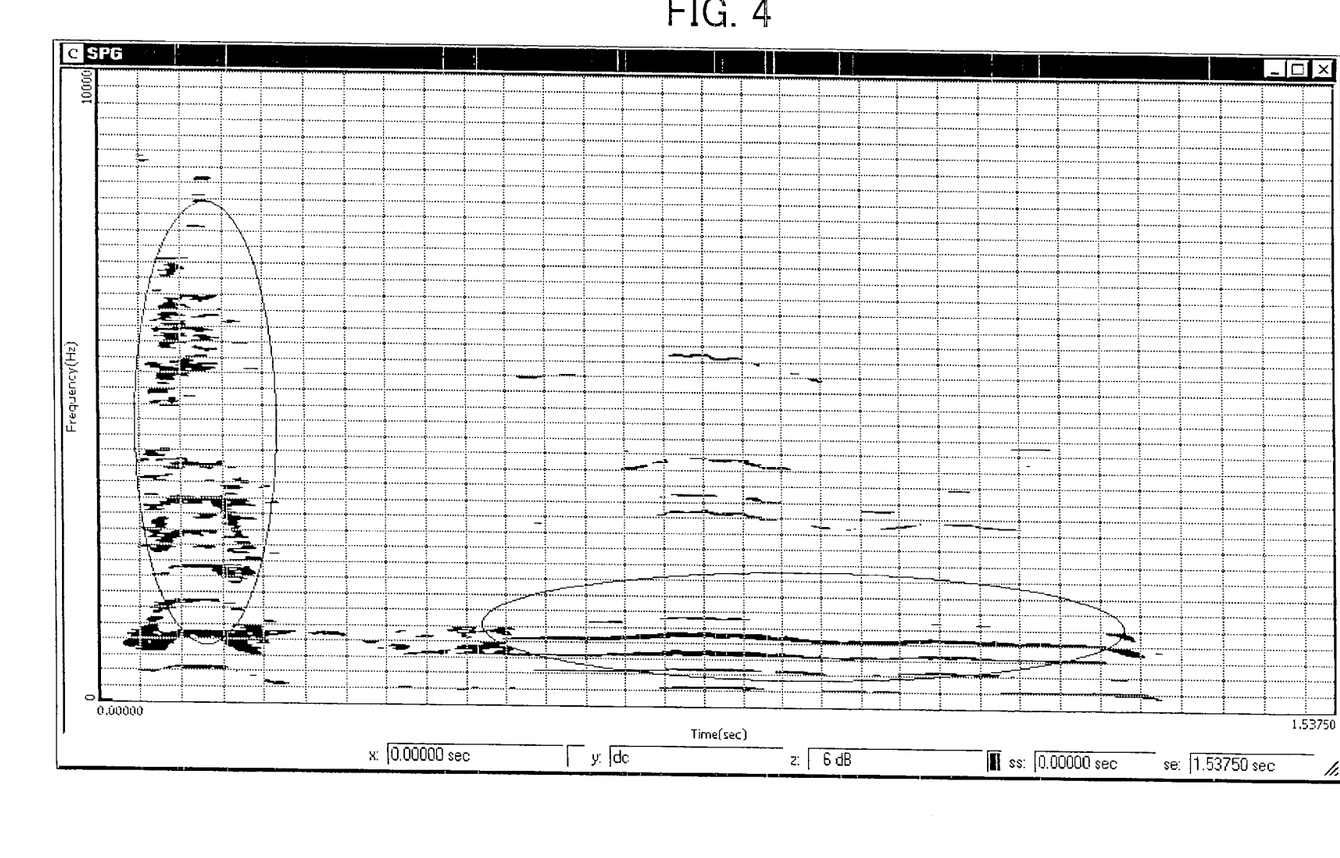
FIG. 4 is a diagram illustrating "time to frequency component relation map" that represents a typical voice pattern to "aggressiveness" (the horizontal axis is divided every 0.05 second while the vertical axis is divided every 250 Hz; and significant characteristics are encircled)

A voice pattern expressing "aggressiveness" is made up of a sub-pattern ranging from 250 to 8000 Hz without definite fundamental tones and harmonics, and conspicuous for frequency components around 1000 Hz, and a subsequent sub-pattern for 0.8 to 1.5 second of fundamental tones ranging from 240 to 360 Hz with definite harmonics up to 1500 Hz and extending to 8000 Hz. This voice pattern often sounds snarlingly like "Bow, GarooGarooGaroo". FIG. 4 is a graph of the "time to frequency component map" that represents the typical voice pattern for "aggressiveness".

Figure 5:
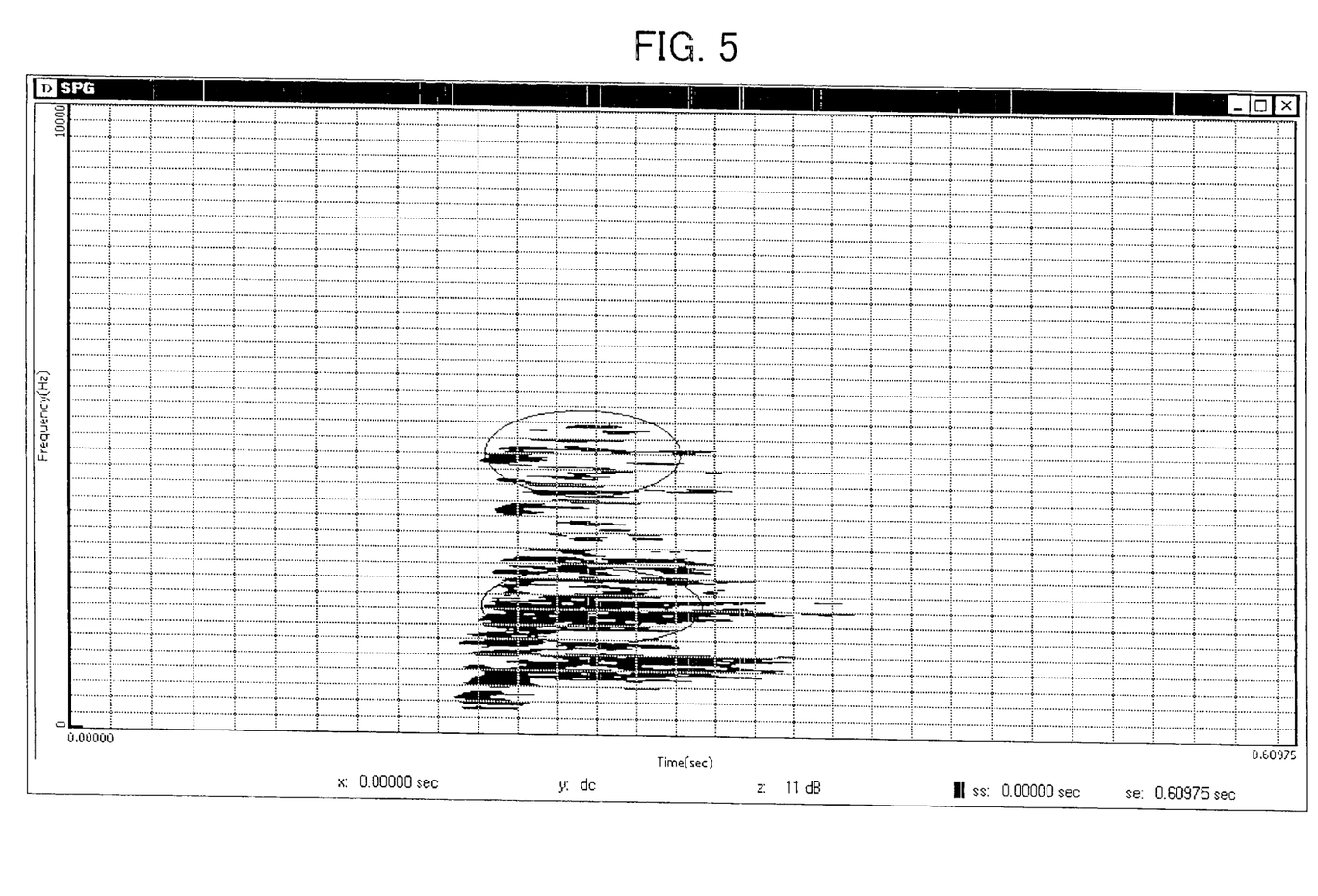
FIG. 5 is a diagram illustrating "time to frequency component relation map" that represents a typical voice pattern to "assertiveness" (the horizontal axis is divided every 0.02 second while the vertical axis is divided every 250 Hz; and significant characteristics are encircled)

A voice pattern expressing "assertiveness" is made up of frequency components ranging from 250 to 8000 Hz without definite fundamental tones and harmonics, and with conspicuous for frequency components around 1000 Hz, 2000 Hz and 5000 Hz, respectively. This voice pattern is audible in "yelping" sound. FIG. 5 is a graph of the "time to frequency component relation map" that represents the typical voice pattern for "assertiveness".

Figure 6:
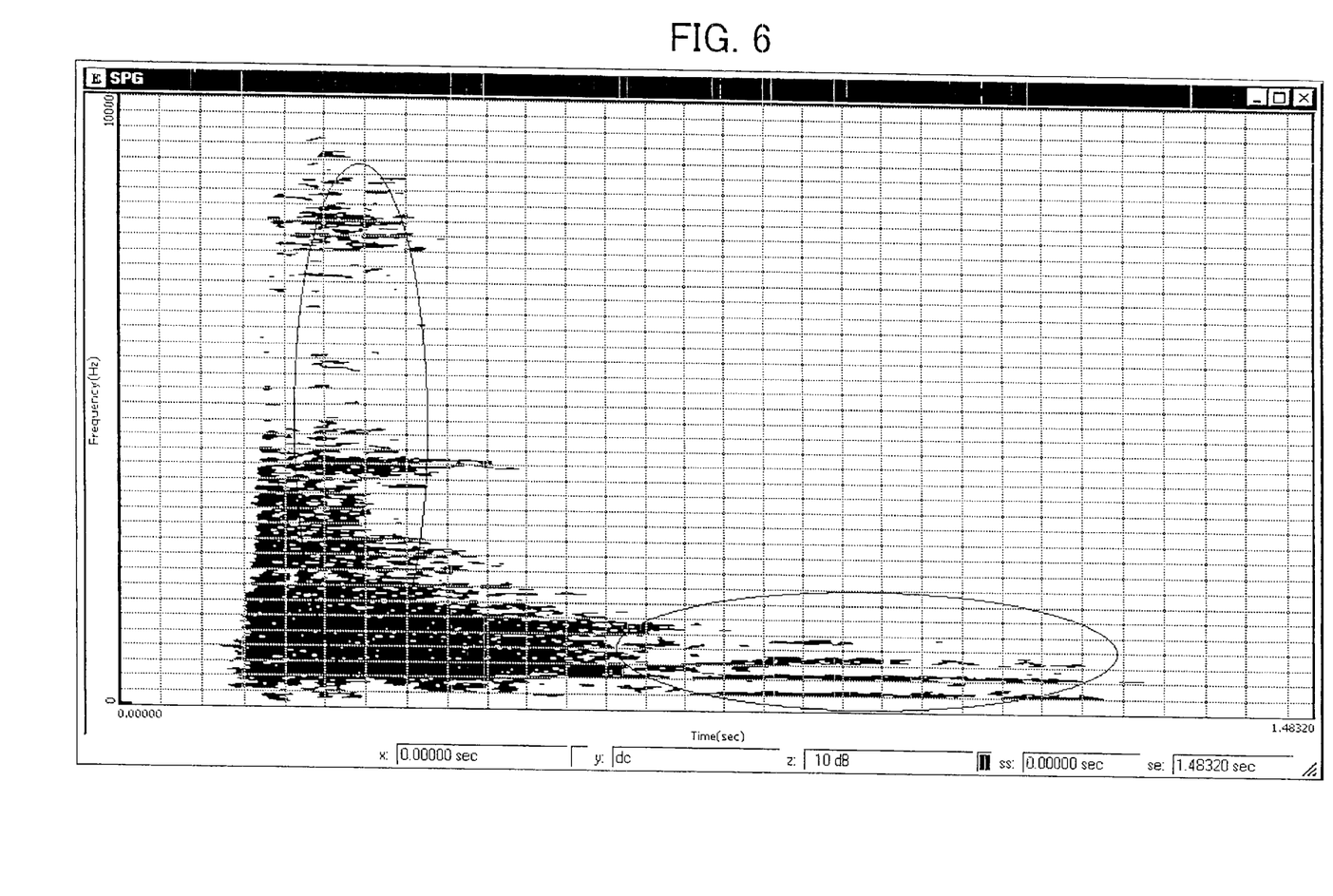
FIG. 6 is a diagram illustrating "time to frequency component relation map" that represents a typical voice pattern to "happiness" (the horizontal axis is divided every 0.05 second while the vertical axis is divided every 250 Hz; and significant characteristics are encircled)

A voice pattern for "happiness" includes a sub-pattern of frequency components ranging from 250 to 8000 Hz without definite fundamental tones and harmonics, and with conspicuous frequency components around 1000 Hz and a subsequent sub-pattern of fundamental tones ranging from 200 to 300 Hz with harmonics up to 1500 Hz. This voice pattern often sounds like "BowWow, Gooooooo". FIG. 6 is a graph of the "time to frequency component relation map" that represents the typical voice pattern for "happiness".

Figure 7:
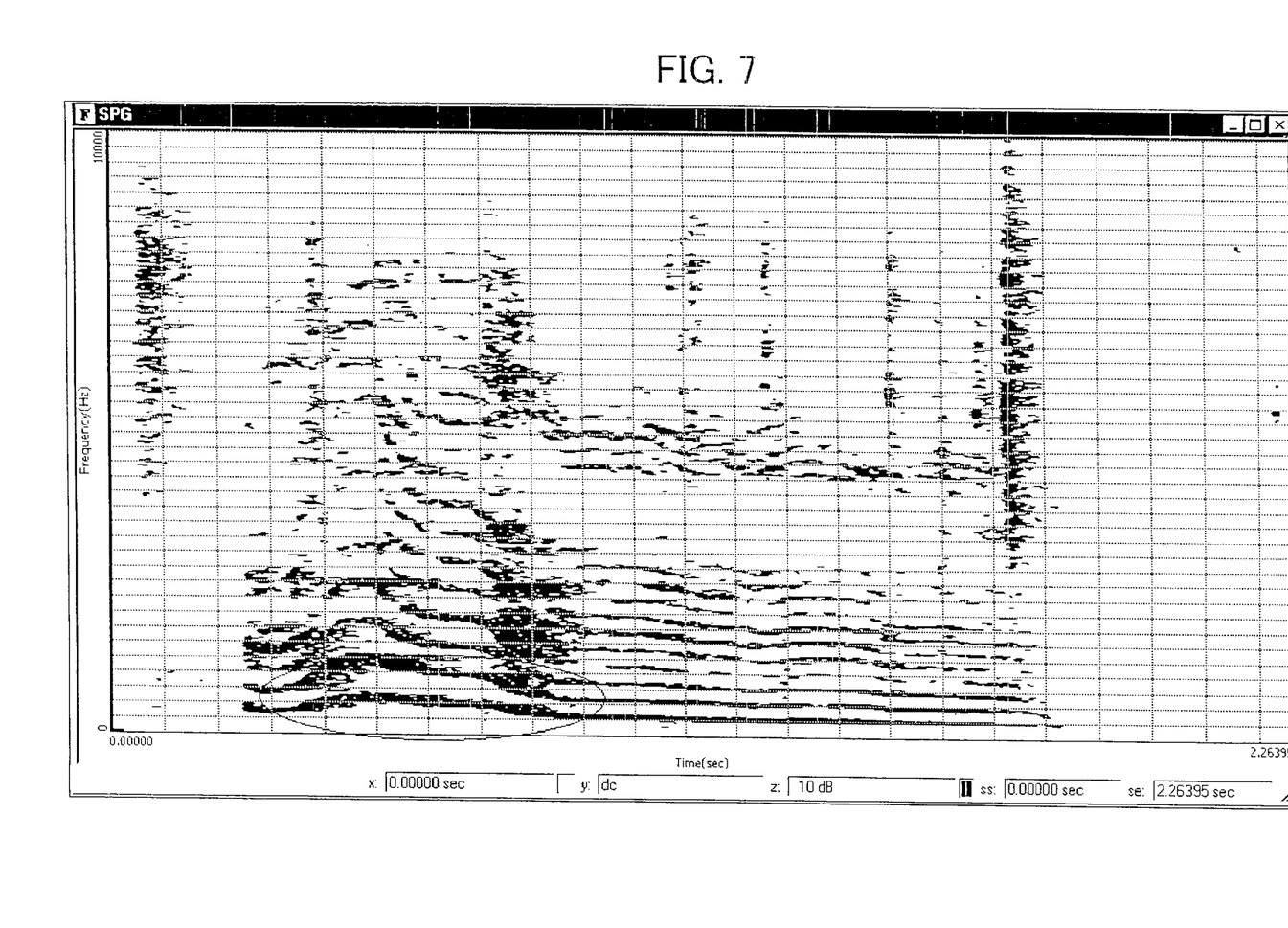
FIG. 7 is a diagram illustrating "time to frequency component relation map" that represents a typical voice pattern to "wistfulness" (the horizontal axis is divided every 0.1 second while the vertical axis is divided every 250 Hz; and significant characteristics are encircled)

A voice pattern expressing "wistfulness" is made up of fundamental tones ranging from 250 to 500 Hz with harmonics up to 8000 Hz and with frequency of said fundamental tones being varied. This voice pattern often sounds like "Ghyooo". FIG. 7 is a graph of the "time to frequency component relation map" that represents the typical voice pattern for "wistfulness".

The comparator 5 is a component used to compare the input voice pattern with the reference voice patterns for various emotions. The comparator 5 consists of a CPU (or otherwise, a DSP as desired), ROM that stores a program which makes the CPU serve as the comparator 5, RAM for work areas, and the like that are not individually shown. Comparison can be carried out by means of pattern matching where characteristic patterns undergo Hamming processing. The results of the comparison are produced as High or Low correlation. For instance, with the reference voice patterns shown in FIG. 8, the comparator 5 computes a distance $Xm = |\alpha m - \alpha x| + |\beta m - \beta x| + |\gamma m - \gamma x| + |\delta m - \delta x| + |\epsilon m - \epsilon x|$ in comparison of the input voice pattern ($\alpha m$, $\beta m$, $\gamma m$, $\delta m$, $\epsilon m$) with the corresponding data of the reference voice patterns ($\alpha x$, $\beta x$, $\gamma x$, $\delta x$, $\epsilon x$). The distance $Xm$ is an index that indicates an extent of the correlation of the input voice pattern and the reference voice patterns compared with the same. The emotion category corresponding to the data set ($\alpha m0$, $\beta m0$, $\gamma m0$, $\delta m0$, $\epsilon m0$) that leads to the minimum value of the distance $Xm$ should be the one that shows the highest correlation with the input voice pattern. The distance $Xm = |\alpha m - \alpha m0| + |\beta m - \beta m0| + |\gamma m - \gamma m0| + |\delta m - \delta m0| + |\epsilon m - \epsilon m0|$ in this case comes to a minimum. In the examples in FIG. 8, since the reference voice pattern a1 unique to Dog Group B is ($\alpha m0$, $\beta m0$, $\gamma m0$, $\delta m0$, $\epsilon m0$), this data set leads to the distance Xm being a minimum, and therefore, it is determined that the Emotion Category a is the emotion expressed by the input voice pattern. The comparator 5 may straightforwardly compare the input voice pattern with the data of the reference voice patterns regardless of what kind of dog groups a subject belongs to. Alternatively, the comparator 5 may get a dog group of the subject in advance, and the comparison of the input voice pattern of the subject with the reference voice patterns is carried out in a limited range of the dog group. In this way, added data on the dog group can bring about more accurate analysis of emotions.

The analyzing means 6 is a component that determines, as the emotion of the subject dog, a specific emotion corresponding to the reference voice pattern having the highest correlation with the input voice pattern of the subject as a result of the comparison with the reference voice patterns by the comparator 5. The analyzing means 6 consists of a CPU (or otherwise, a DSP as desired), ROM that stores a program which makes the CPU serve as the analyzing means 6, RAM for work areas, and the like that are not individually shown.

The output means 7 is a component that externally outputs the result of the analysis by the analyzing means 6. The output means 7 may be a display apparatus such as liquid crystal display screen and its drive circuit that enable characters and graphics representation, or otherwise, it may be a sound device such as a speaker and an audible sound generating circuit. The output means 7 may alternatively produce the analysis result in a digital data format that is received at other devices for any particular use. For example, the analysis result or emotion data may be sent to an operation controller of a dog-shaped robot so that the robot can conduct a certain action specific to the emotion data. Thus, the output means 7 can produce the analyzed emotions as a command set to control motions of the robot.

Now, the flow of a sequential operation of the emotion determining apparatus 1 will be described. First, the transducer 2 converts a barking sound made by a subject dog into digitized audio signals. Then, the input voice pattern extractor 3 extracts characteristic voice patterns from the audio signals. The voice pattern is extracted in a form of the relation map and allocated in the RAM. The comparator 5 reads the reference voice patterns corresponding to various emotions stored in the emotions based reference voice patterns memory 4, and compares the input voice pattern in the RAM with the reference voice patterns in the emotions based reference voice patterns memory 4. The comparison can be carried out by means of pattern matching where the characteristic patterns undergo Hamming processing. As a result of the comparison, correlations of the input voice pattern with the various emotions are obtained in numerical analysis data. After that, the analyzing means 6 determines that the emotion of the subject dog is an emotion corresponding to the reference voice pattern having the highest correlation. Eventually, the output means 7 produces and outputs characters, a voice, digitized data, the motion of an object, and the like that expresses the emotion.

The invention as defined in Claim 1 and Claim 2 follows the procedures of converting dog's voices into electrical audio signals, extracting characteristics in a time to frequency component relation map of the audio signals as an input voice pattern, storing in advance in emotions based reference voice patterns memory the reference voice patterns for various emotions that respectively represent characteristics of time to frequency component relation maps, comparing the input voice pattern with the reference voice patterns, and determining that the emotion of the subject dog is an emotion corresponding to the reference voice pattern having the highest correlation with the input voice pattern as a result of the comparison, wherein said emotions represented by the reference voice patterns include "loneliness", "frustration", "aggressiveness", "assertiveness", "happiness", and "wistfulness", and hence, the present invention attains an effective way of determining dog's emotions based upon its barking sound with objective supports.

What is claimed is:

1. An apparatus of determining dog's emotions by vocal analysis of dog's voice patterns, comprising means for converting dog's voices into electrical audio signals, means for extracting characteristics in a time to frequency component relation map of the audio signals as an input voice pattern, means for storing reference voice patterns that represent various dog's emotions expressed by its voice in a form of the time to frequency component relation map, means for comparing the input voice pattern with the reference voice patterns, and means for determining how the dog feels by choosing the pattern most closely matched to the input voice pattern;

wherein the apparatus being characterized in that the reference voice patterns include a reference voice pattern expressing loneliness that is made up of significant frequency components around 5000 Hz without frequency components of 3000 Hz or below but lacks harmonics and lasts for 0.2 to 0.3 second, a reference voice pattern expressing frustration that is made up of a sub-pattern for 0.3 to 1 second of fundamental tones ranging from 160 to 240 Hz with harmonics up to 1500 Hz and a subsequent sub-pattern of 250 to 8000 Hz without definite fundamental tones and harmonics but is conspicuous for frequency components around 1000 Hz, a reference voice pattern expressing aggressiveness that is made up of a sub-pattern ranging from 250 to 8000 Hz without definite fundamental tones and harmonics and conspicuous for frequency components around 1000 Hz and a subsequent sub-pattern for 0.8 to 1.5 second of fundamental tones ranging from 240 to 360 Hz with definite harmonics up to 1500 Hz and reaching 8000 Hz, a reference voice pattern expressing assertiveness that is made up of frequency components ranging from 250 to 8000 Hz without definite fundamental tones and harmonics and is conspicuous for frequency components around 1000 Hz, 2000 Hz and 5000 Hz, respectively, a reference voice pattern expressing happiness including a sub-pattern of frequency components ranging from 250 to 8000 Hz without definite fundamental tones and harmonics and with conspicuous frequency components around 1000 Hz and a subsequent sub-pattern of fundamental tones ranging from 200 to 300 Hz with harmonics up to 1500 Hz, and a reference voice pattern expressing wistfulness that is made up of fundamental tones ranging from 250 to 500 Hz with harmonics up to 8000 Hz and with frequency of the fundamental tones being varied.

2. A method for determining dog's emotions by vocal analysis of dog's voice patterns, comprising the steps of converting dog's voices into electrical audio signals, extracting characteristics in a time to frequency component relation map of the audio signals as an input voice pattern, storing reference voice patterns that represent various dog's emotions expressed by its voice in a form of the time to frequency component relation map, comparing the input voice pattern with the reference voice patterns, and determining how the dog feels by choosing the pattern most closely matched to the input voice pattern;

the method being characterized in that the reference voice patterns include a reference voice pattern expressing loneliness that is made up of significant frequency components around 5000 Hz without frequency components of 3000 Hz or below but lacks harmonics and lasts for 0.2 to 0.3 second, a reference voice pattern expressing frustration that is made up of a sub-pattern for 0.3 to 1 second of fundamental tones ranging from 160 to 240 Hz with harmonics up to 1500 Hz and a subsequent sub-pattern of 250 to 8000 Hz without definite fundamental tones and harmonics but is conspicuous for frequency components around 1000 Hz, a reference voice pattern expressing aggressiveness that is made up of a sub-pattern ranging from 250 to 8000 Hz without definite fundamental tones and harmonics and is conspicuous for frequency components around 1000 Hz and a subsequent sub-pattern for 0.8 to 1.5 second of fundamental tones ranging from 240 to 360 Hz with harmonics definite up to 1500 Hz and reaching 8000 Hz, a reference voice pattern expressing assertiveness that is made up of frequency components ranging from 250 to 8000 Hz without definite fundamental tones and harmonics and is conspicuous for frequency components around 1000 Hz, 2000 Hz and 5000 Hz, respectively, a reference voice pattern expressing happiness including a sub-pattern of frequency components ranging from 250 to 8000 Hz without definite fundamental tones and harmonics and with conspicuous frequency components around 1000 Hz and a subsequent sub-pattern of fundamental tones ranging from 200 to 300 Hz with harmonics up to 1500 Hz, and a reference voice pattern expressing wistfulness that is made up of fundamental tones ranging from 250 to 500 Hz with harmonics up to 8000 Hz and with frequency of the fundamental tones being varied.

* * * * *